Nov. 24, 1953     O. PONTIUS     2,660,168
SYRINGE CASING AND STOPPERED CYLINDRICAL
AMPOULE FOR DIRECT INJECTION
Filed July 10, 1951
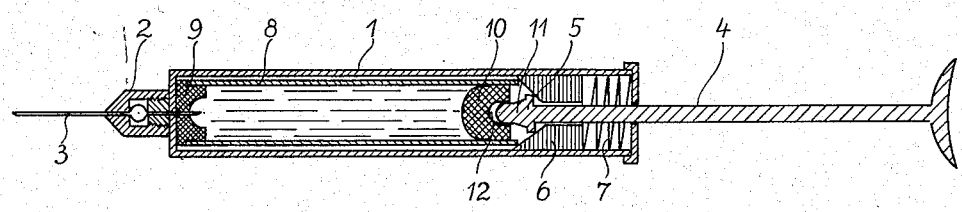
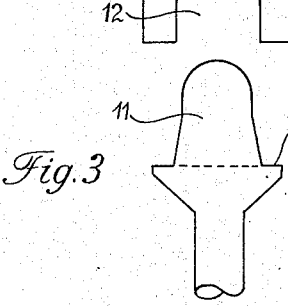
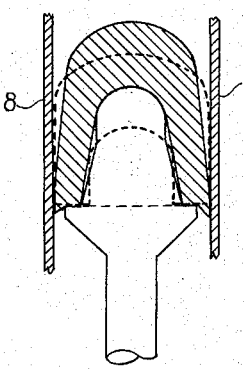
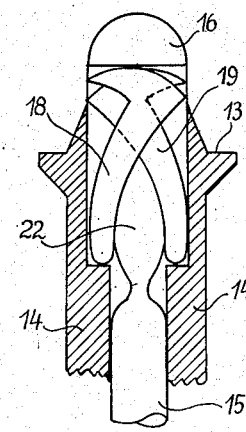
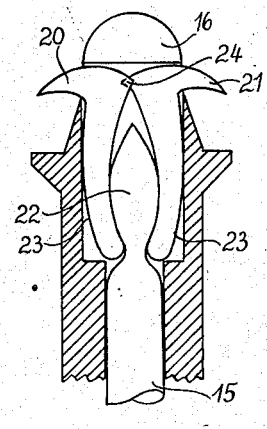
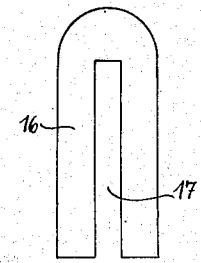
INVENTOR
Oswald Pontius
BY
Richardson, David and Nordon
his ATTORNEYS.

Patented Nov. 24, 1953

2,660,168

UNITED STATES PATENT OFFICE 2,660,168

SYRINGE CASING AND STOPPERED CYLINDRICAL AMPOULE FOR DIRECT INJECTION

Oswald Pontius, Frankfurt am Main Hochst, Germany, assignor to Farbwerke Hoechst A. G. vormals Meister Lucius und Brüning, Frankfurt am Main, Germany, a company of Germany Application July 10, 1951, Serial No. 235,926

Claims priority, application Germany July 20, 1950

2 Claims. (Cl. 128—218)

The present invention relates to a syringe casing and stoppered cylindrical ampoule for direct injection.

At the present time cylindrical ampoules for direct injection which require a special casing, the "syringe," for moving the sealing stopper, which serves as a piston to expell the injection liquid, are being increasingly used. However, such an arrangement involves disadvantages which have not been overcome satisfactorily hitherto.

If the movable stopper to be pushed into the interior of the ampoule by the plunger head is a plain cylindrical rubber stopper, it may stick to the surrounding wall, especially after long storage. This is a great inconvenience. Experience has shown that cylindrical stoppers, even when they adhere slightly, can be freed only with great difficulty by pushing. Even if they can be freed at all without breaking the ampoule, they can be moved forwards only in jerks and jumps. This, of course, makes injection impossible. In order to effect tight sealing the stopper must not be seated too loosely. Consequently it is not possible to retract it, that is to say, to effect a suction or "aspiration," which for some methods of injection is indispensable for ascertaining whether a blood vessel has been injured.

It has also been proposed to provide the piston stopper with annular grooves for a lubricating liquid, for instance, glycerol. Sticking is not entirely avoided in this manner, but smooth sliding of the stopper is ensured. This expedient however, complicates and increases the cost of manufacture of cylindrical ampoules. In order to enable the stopper to be retracted, a metal cylinder having an internal thread, or a metal screw having an external thread, is vulcanized into the stopper, and the plunger head is provided with a correspondingly threaded pin or bore so that the stopper can be screwed to the plunger. This, however, considerably increases the manufacturing cost of the stopper, which, moreover, can be used only once.

The present invention overcomes these disadvantages in a simple manner by providing a stopper and a plunger head of special design, and also includes a simple mechanism in the plunger head for enabling aspiration to be carried out.

Accordingly, this invention provides a syringe casing and stoppered cylindrical ampoule for direct injection, wherein the movable ampoule stopper of resilient material is provided with a cavity to receive an extension projection from a bearing surface on the plunger head, and the extension is of greater length and of less width at its outer portion than the depth and width, respectively, of the cavity, and widens conically at its inner portion towards the bearing surface to a width exceeding that of the cavity, so that when the extension is introduced into the cavity the stopper is stretched and shrinks away from the ampoule wal lexcept at the rim which is pressed against the wall by the conical portion of the extension.

In order to enable aspiration to be carried out hooks may be housed within the extension of the plunger head, and means provided for swinging outwards and retracting the hooks in a lateral direction for engaging and disengaging the inner wall of the cavity in the ampoule stopper.

An example of a syringe casing and stoppered cylindrical ampoule constructed in accordance with the invention is shown in the accompanying drawings.

Fig. 1 is a longitudinal section showing the syringe casing, plunger piston and injection needle assembly;

Fig. 2 is a fragmentary longitudinal section of a stopper for the syringe ampoule;

Fig. 3 is a longitudinal sectional view of the specially constructed plunger head;

Fig. 4 is a view, partly in section, illustrating how the plunger head and its conical extension cooperates with the ampoule stopper;

Fig. 5 is a view, partly in section, of a modified form of my device wherein hooks to retract the stopper are provided. In this view, the hooks are shown in a retracted position;

Fig. 6 is a view similar to Fig. 5, but with the hooks in an extended position, wherein they are capable of penetrating the stopper; and Fig. 7 is a view in elevation of the slotted cylinder with rounded upper end as employed in the modification of the invention illustrated in Figs. 5 and 6.

Fig. 1 shows diagrammatically in longitudinal section the syringe casing which consists, as is known, of a cylindrical tube having an opening at one end, which receives the ampoule, a head member 2 to which the injection needle 3 is fixed (unless the injection ampoules have a cannula fitted thereto), a plunger 4 having a specially shaped head 5, a cylindrical guide 6 for the plunger having a conical recess for centering the cylindrical ampoule by the pressure of the spring 7. 8 is the cylindrical ampoule, 9 is the "needle stopper" and 10 the movable "piston stopper" also of special shape.

Fig. 2 is a fragmentary longitudinal section of a piston stopper. The principal feature is the cavity 12 facing the plunger head. Fig. 3 is a longitudinal section of the specially constructed plunger head. The important feature is that the diameter of the extension 11 is smaller at its outer end than the diameter of the cavity in the stopper, and is broader at its inner end than the diameter of the cavity, and also that its total length back to the bearing surface 13 exceeds the depth of cavity 12. Fig. 4 illustrates the operation of the plunger. In this figure, the stopper is surrounded by the wall 8 of the cylindrical ampoule, and is shown deformed by the pressure on the plunger by hatched section and in its original form by dotted lines. In view of the fact that the extension 11 of the plunger head beyond the bearing surface 13 is longer than the cavity 12 the stopper is stretched and lifted off the glass wall. The liquid contained in the ampoule flows into the space thus formed between the glass and the rubber, and serves as a lubricating liquid. The conical portion of the extension 11 of the plunger head prevents leakage, since it presses the lower rim of the stopper against the glass wall. In this manner even a rather tight fitting stopper can be freed without risk of breakage and moved smoothly without leakage. This arrangement has the further advantage of ensuring satisfactory guidance of the plunger in the cylindrical ampoule, such that contact between metal and glass, which always involves the risk of breakage, is avoided.

The device by means of which the stopper can be retracted consists of two small hooks which can be forced out of the plunger head so as to penetrate like barbs into the rubber. Figs. 5 and 6 show an example of this device. The plunger proper 14 (hatched) is provided with the bearing surface 13, and consists of a tube in which a metal rod 15 is slidably mounted. 16 is a cylinder having a rounded upper end. The cylinder is also shown in Fig. 7, but turned through 90 degrees to show the slot 17, which houses the device. The cylinder 16 is inserted from above into a corresponding cylindrical cavity in the top of the tubular plunger 14, and, if desired, screwed to it. The slot 17 forms a flat rectangular chamber within the plunger head. The lower end of the chamber communicates with the bore of the tubular plunger. Above the upper edge of 14 the chamber has on each side a small rectangular opening. Moreover, cylinder 16 completes the profile of the plunger head to conform with that shown in Fig. 3. Within the chamber 17 are two specially shaped hooks 18 and 19 having barbs 20 and 21. The rod 15 has a specially shaped head 22, of which the mode of operation can be seen from Figs. 5 and 6. Fig. 5 shows the plunger head with the barbs retracted for normal injection. Fig. 6 shows the head with the barbs swung out for injection followed by aspiration. The hooks are operated by moving the metal rod 15 within the plunger 14. The parts of the hooks which overlap in the retracted state have a thickness half of that of the lower parts. In their extended position they must overlap to a slight extent at 24, as shown in Fig. 6, so that they do not become locked.

Cylindrical ampoules, which have a cannula fitted thereto instead of the needle stopper 9 (Fig. 1), naturally require a head differing from that shown at 2. For this purpose it is sufficient to use a support adapted to the shoulders of the ampoule. By providing interchangeable heads, the syringe casing can be used universally.

I claim:

1. In a syringe casing adapted to inclose a cylindrical ampoule of the type wherein a movable stopper of resilient material is provided, said stopper being capable of movement along the cylindrical wall of said ampoule and, by said movement, serving to expel liquid from said syringe, the combination which comprises: a cylindrical ampoule; a movable stopper of resilient material in one end of said ampoule; said stopper being provided with a cavity in the exterior portion thereof; a plunger formed with a plunger head facing said cavity in said stopper, said plunger head being provided with a conical extension which extends from a bearing surface on said plunger head; said conical extension being of greater length and less width at its outer portion than the depth and width, respectively, of said cavity in said stopper and widening conically, at its inner portion as it approaches said bearing surface to a width which exceeds that of said cavity, whereby when said conical extension is introduced into said cavity said stopper is stretched longitudinally, so that only its outer exterior portion is pressed as a rim portion against said cylindrical wall of said ampoule, said stopper, except at said rim portion, shrinking away from said cylindrical wall of said ampoule without, however, becoming loose with respect thereto.

2. In a syringe device as claimed in claim 1, the arrangement wherein said plunger is tubular and is provided with a hollow extension; wherein a plurality of hooks for engaging and retracting said movable stopper are provided, said hooks being housed within said hollow extension; and wherein an operating rod is provided within said tubular plunger for swinging said hooks outwardly from said hollow extension to stopper-engaging position, said operating rod being provided at its terminal portion with a shaped head portion for engaging said hooks so that they may be swung outwardly to engage said stopper, or retracted within said hollow extension when they are to be disengaged from said stopper.

OSWALD PONTIUS.

References Cited in the file of this patent

UNITED STATES PATENTS

| Number | Name | Date |
| --- | --- | --- |
| 2,068,927 | Nevin | Jan. 26, 1937 |

FOREIGN PATENTS

| Number | Country | Date |
| --- | --- | --- |
| 367,153 | France | Aug. 23, 1906 |